United States Patent
Ahn (10) Patent No.: US 10,914,271 B1
(45) Date of Patent: Feb. 9, 2021

(54) LEAK DIAGNOSIS SYSTEM USING PURGE PUMP OF ACTIVE PURGE SYSTEM AND LEAK DIAGNOSIS METHOD USING PURGE PUMP OF ACTIVE PURGE SYSTEM

(71) Applicants: Hyundai Motor Company, Seoul (KR); Kia Motors Corporation, Seoul (KR)

(72) Inventor: Tae-Ho Ahn, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/857,492

(22) Filed: Apr. 24, 2020

(30) Foreign Application Priority Data

Dec. 27, 2019 (KR) .................. 10-2019-0176421

(51) Int. Cl.
*F02M 25/08* (2006.01)

(52) U.S. Cl.
CPC ........ *F02M 25/0818* (2013.01); *F02M 25/08* (2013.01)

(58) Field of Classification Search
CPC ................... F02M 25/0818; F02M 25/08
See application file for complete search history.

(56) References Cited

U.S. PATENT DOCUMENTS

| 10,823,119 B2* | 11/2020 | Eom | F02M 25/0854 |
| 2003/0110836 A1 | 6/2003 | Cho | |
| 2006/0225713 A1* | 10/2006 | Kano | F02D 41/0045 |
| | | | 123/520 |
| 2007/0157908 A1* | 7/2007 | Kano | F02M 25/08 |
| | | | 123/520 |
| 2009/0133673 A1* | 5/2009 | Amano | B60W 20/15 |
| | | | 123/520 |
| 2014/0026867 A1* | 1/2014 | Itoh | F02M 25/0809 |
| | | | 123/520 |
| 2018/0274490 A1* | 9/2018 | Honjo | F02M 25/0872 |

FOREIGN PATENT DOCUMENTS

KR 20030050120 A 6/2003

* cited by examiner

*Primary Examiner* — Xiao En Mo
(74) *Attorney, Agent, or Firm* — Slater Matsil, LLP (57) ABSTRACT

A leak diagnosis system using a purge pump of an active purge system is provided. The leak diagnosis system includes a canister for adsorbing an evaporated gas from a fuel tank, a purge line for connecting the canister with an intake pipe, the purge pump and a purge control solenoid valve mounted to the purge line, and an auxiliary canister and an auxiliary canister control valve mounted to the purge line and located between the intake pipe and the purge control solenoid valve.

20 Claims, 7 Drawing Sheets

LEAK DIAGNOSIS SYSTEM USING PURGE PUMP OF ACTIVE PURGE SYSTEM AND LEAK DIAGNOSIS METHOD USING PURGE PUMP OF ACTIVE PURGE SYSTEM

CROSS-REFERENCE TO RELATED APPLICATIONS

This application claims priority to Korean Patent Application No. 10-2019-0176421, filed on Dec. 27, 2019, which application is hereby incorporated herein by reference.

TECHNICAL FIELD

The present disclosure relates to a leak diagnosis system using a purge pump of an active purge system and a leak diagnosis method using the purge pump of the active purge system.

BACKGROUND

A hybrid vehicle stops an engine to improve fuel efficiency in an idle stop section. For this reason, the conventional fuel system leak diagnosis method of the internal combustion engine vehicle, which has determined whether the leak occurs based on a pressure sensing signal of a pressure sensor mounted in a fuel tank in the idle state, is not applicable.

Figure 1:
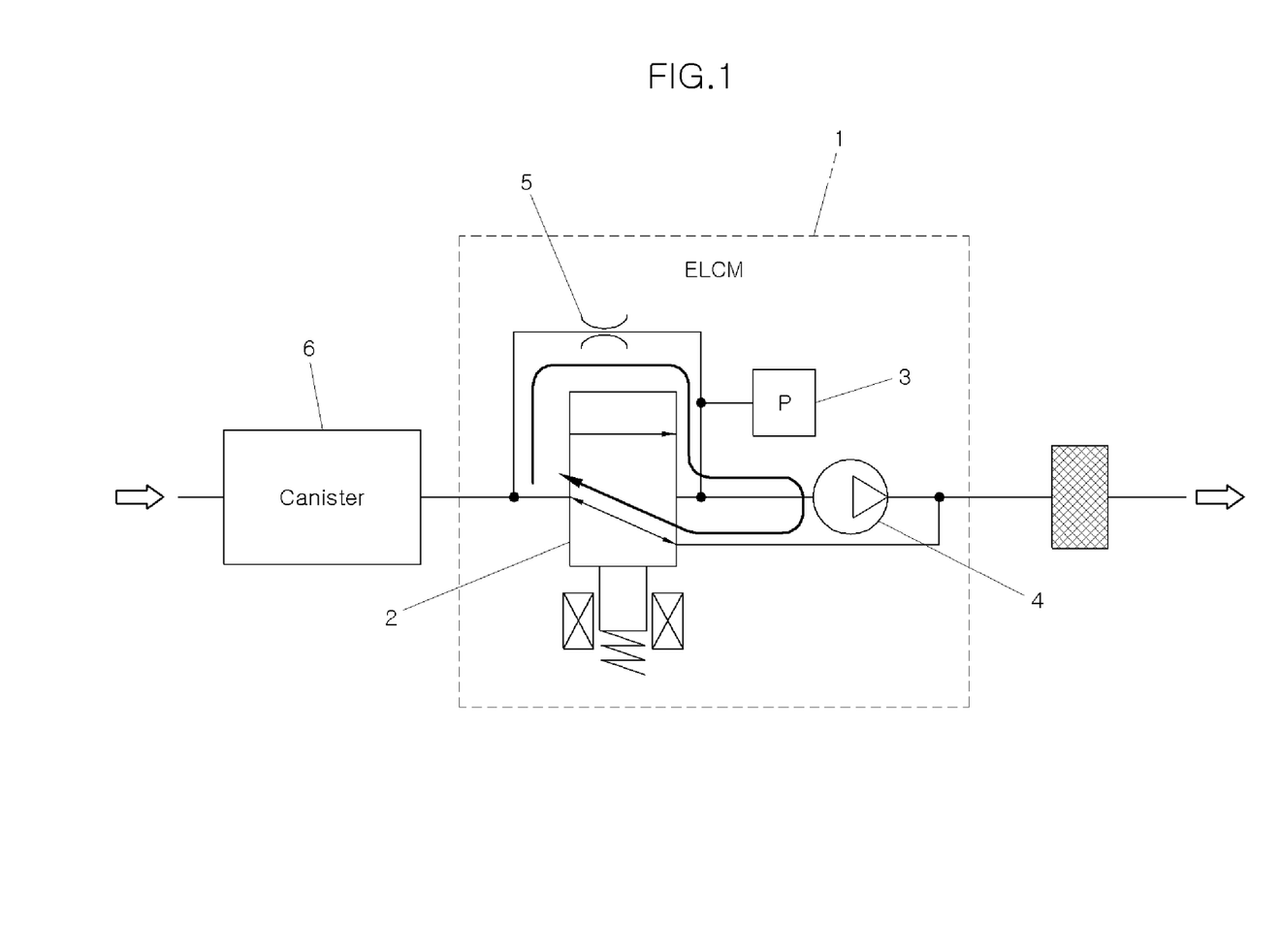
FIGS. 1 and 2 are operation state diagrams of a conventional ELCM module.
Figure 2:
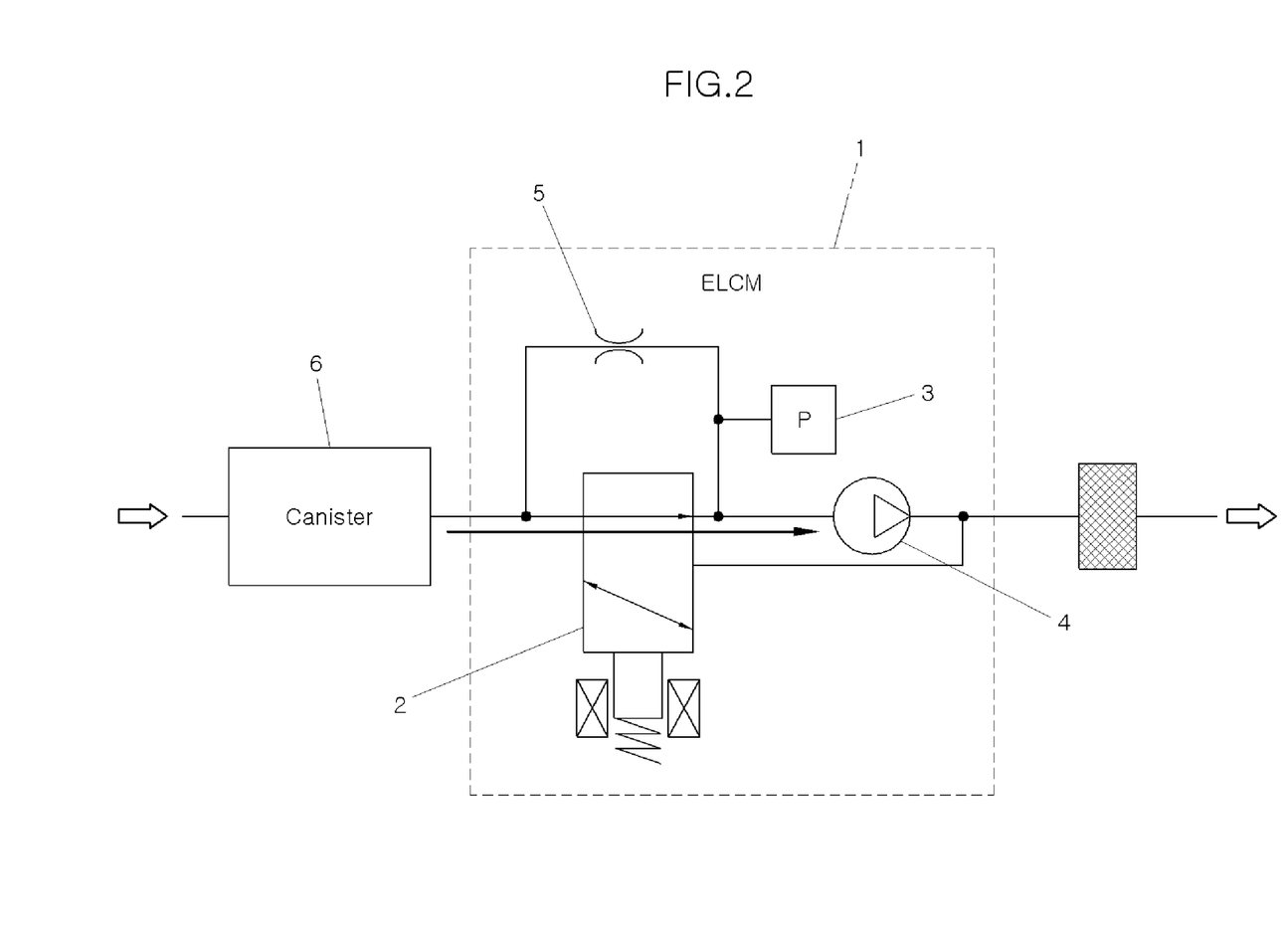
Figure 3:
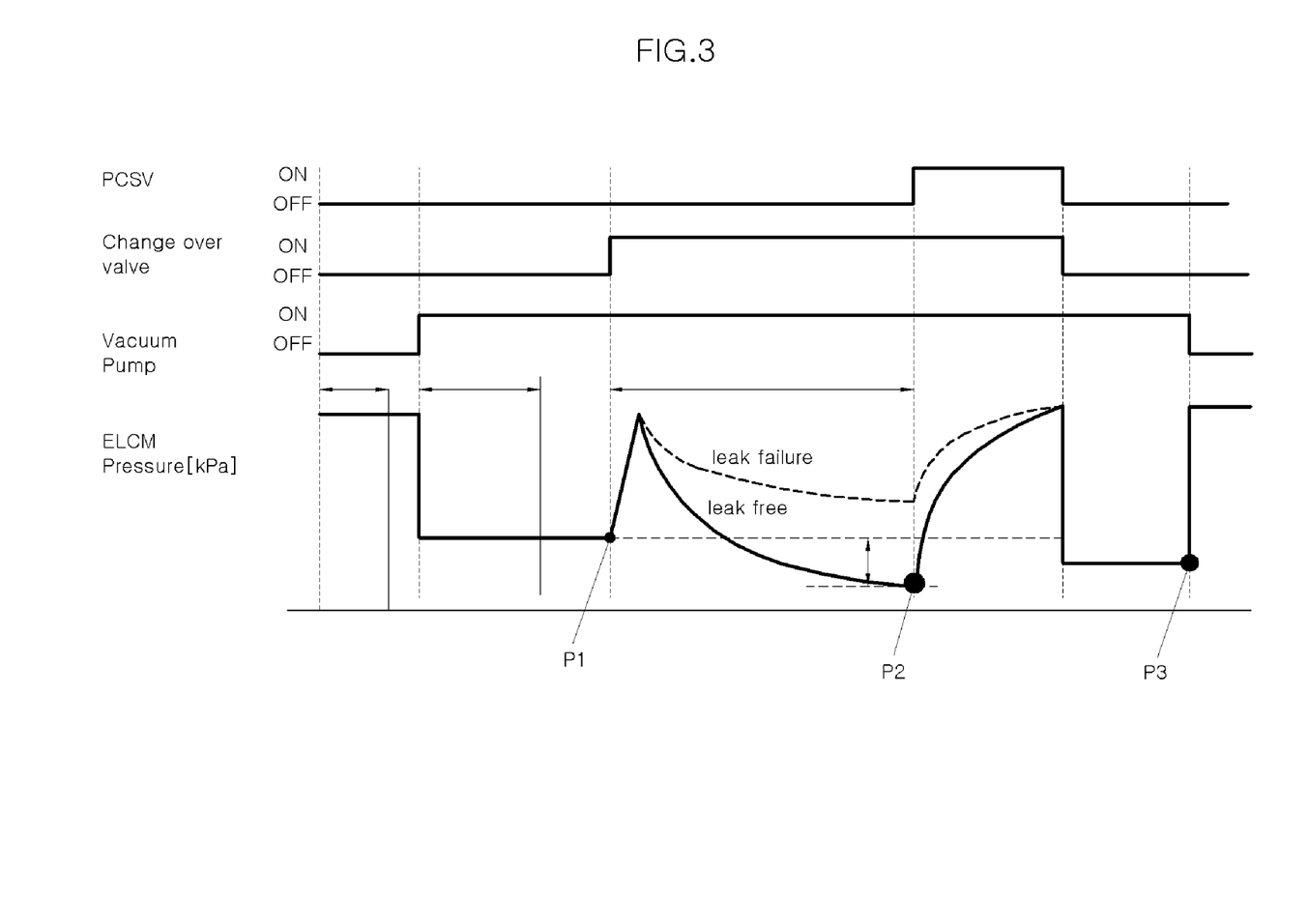
FIG. 3 is a graph of a signal generated in a pressure sensor mounted to an ELCM module of FIGS. 1 and 2.

Accordingly, the hybrid vehicle diagnoses the leak of the fuel system in the engine stop state by using an evaporative leak check monitor (ELCM) module 1 as shown in FIGS. 1 to 3.

As shown in FIG. 1, in a state where a switching valve 2 is inoperative, the atmospheric pressure is measured through a pressure sensor 3, and then a vacuum pump 4 is operated to generate airflow inside the ELCM module 1. A reference orifice 5 is mounted in the ELCM module 1, and the pressure sensor 3 is mounted at the rear end of the reference orifice 5 based on the airflow direction. The flow rate of the air flowing to the pressure sensor 3 by the reference orifice 5 becomes constant. Accordingly, the magnitude of the signal generated by the pressure sensor 3 reaches an arbitrary value according to various environmental variables. This arbitrary value is measured as a first reference pressure value (P1).

In addition, as shown in FIG. 2, the switching valve 2 is operated to generate airflow in the fuel system including a canister and the fuel tank. The flow rate discharged from the fuel system to the atmosphere is gradually reduced. Accordingly, as shown in FIG. 3, the magnitude of the signal generated by the pressure sensor 3 decreases non-linearly after reaching an arbitrary value and reaches a specific value according to various environmental variables. The specific value reached at this time is measured as a leak determination value (P2).

When the leak determination value (P2) is measured, a purge control solenoid valve mounted to a purge line is opened. Since the outside air flows into the canister 6 through the purge line, a continuous measurement signal generated through the pressure sensor 3 is changed in its shape in a non-linearly increasing form, and becomes the same magnitude as the atmospheric pressure measured previously. The failure of the purge control solenoid valve and the failure of the vacuum pump 4 are diagnosed based on the nonlinear change in the signal generated by the pressure sensor 3 in a state where the purge control solenoid valve has been opened.

When the measurement signal from the pressure sensor 3 becomes the same magnitude as the atmospheric pressure, the purge control solenoid valve is closed, and the switching valve 2 is changed to the inoperative state. Since the vacuum pump 4 is operated in the state where the switching valve 2 is inoperative, the airflow is regenerated in the ELCM module 1. Accordingly, the magnitude of the signal generated by the pressure sensor 3 reaches an arbitrary value according to various environmental variables. This arbitrary value is measured as a second reference pressure value (P3).

Based on the first reference pressure value (P1), the leak determination value (P2), and the second reference pressure value (P3), the state of the ELCM module 1 is determined, and the leak of the fuel system is determined. When the leak determination value (P2) is smaller than the first reference pressure value (P1), it is determined that there is no leak. If the leak determination value (P2) is larger than the first reference pressure value (P1), it is determined that there is a leak.

However, in the leak diagnosis through the ELCM module 1, since the evaporated gas existing in the canister and the purge line is moved to an intake pipe in the state where the purge control solenoid valve has been opened, an air filter mounted to the intake pipe could be contaminated by the evaporated gas, and the evaporated gas could flow out into the atmosphere through the intake pipe.

Meanwhile, an auxiliary canister may be mounted to the purge line connecting the canister and the intake pipe. The evaporated gas collected in the canister may be moved to the auxiliary canister, or the evaporated gas collected in the auxiliary canister may be moved to the canister.

The contents described in the Background are to help the understanding of the background of the present disclosure, and may include what is not previously known to those skilled in the art to which the present disclosure pertains.

SUMMARY

The present disclosure relates to a leak diagnosis system using a purge pump of an active purge system and a leak diagnosis method using the purge pump of the active purge system. Particular embodiments relate to a leak diagnosis system using a purge pump of an active purge system and a leak diagnosis method using the purge pump of the active purge system which prevents an evaporated gas from flowing into an intake pipe when a leak is diagnosed during a stop.

Accordingly, an embodiment of the present disclosure provides a leak diagnosis system using a purge pump of an active purge system and a leak diagnosis method using the purge pump of the active purge system, which prevent an evaporated gas from being moved to an intake pipe during the leak diagnosis, thereby preventing the evaporated gas from being leaked to the atmosphere through the intake pipe, while preventing an air filter mounted to the intake pipe from being contaminated by the evaporated gas.

A leak diagnosis system using a purge pump of an active purge system according to an embodiment of the present disclosure includes a canister for adsorbing an evaporated gas from a fuel tank, a purge line for connecting the canister with an intake pipe, a purge pump and a purge control solenoid valve (PCSV) mounted to the purge line, and an auxiliary canister and an auxiliary canister control valve (CCV) mounted to the purge line to be located between the intake pipe and the purge control solenoid valve.

In addition, the leak diagnosis system using the purge pump of the active purge system may further include a vent line for connecting the canister with the atmosphere, a canister control valve located in the vent line, and a control unit for controlling the operations of the purge pump, the purge control solenoid valve, the canister control valve, and the auxiliary canister control valve.

In addition, the leak diagnosis system using the purge pump of the active purge system may further include an auxiliary vent line for connecting the auxiliary canister with the atmosphere, and a filter and a second auxiliary canister control valve provided in the auxiliary vent line.

In addition, the control unit may diagnose the leak of the fuel tank, the canister, the purge line, and the auxiliary canister from a signal generated by a pressure sensor provided in the fuel tank.

In addition, a first pressure gauge may be mounted to the purge line to be located between the purge pump and the purge control solenoid valve, and a second pressure gauge may be mounted to the purge line to be located between the canister and the purge pump.

A leak diagnosis method using a purge pump of an active purge system according to an embodiment of the present disclosure includes operating an auxiliary canister control valve to be closed after the vehicle is stopped, closing a canister control valve, operating the purge pump, and compressing an evaporated gas between the purge control solenoid valve and the purge pump, operating the purge control solenoid valve to be opened, operating the purge control solenoid valve to be closed after an arbitrary time elapses, stopping the operation of the purge pump, and operating the canister control valve to be opened.

In addition, in the operating of the auxiliary canister control valve to be closed after the vehicle is stopped, the control unit may derive a first reference pressure value and a second reference pressure value from the atmospheric pressure measured by a sensor provided in a vehicle.

In addition, the control unit may store a table, a graph, and an equation for deriving the first reference pressure value and the second reference pressure value by using the measured atmospheric pressure as a variable.

In addition, in the closing of the canister control valve, operating the purge pump, and compressing the evaporated gas between the purge control solenoid valve and the purge pump, the control unit may compare a first leak determination value measured by a pressure sensor provided in the fuel tank with the first reference pressure value.

In addition, the control unit may determine that the purge line, the fuel tank, or the canister is leaked when the first leak determination value is larger than the first reference pressure value.

In addition, the control unit may derive the minimum value of the measured value measured by the pressure sensor as the first leak determination value.

In addition, between the operating of the purge control solenoid valve to be opened and operating the purge control solenoid valve to be closed after an arbitrary time elapses and the stopping of the operation of the purge pump and operating the canister control valve to be opened, the control unit may compare the second leak determination value measured by a pressure sensor provided in the fuel tank with the second reference pressure value.

In addition, the control unit may determine that the purge line or the auxiliary canister is leaked when the second leak determination value is larger than the second reference pressure value.

In addition, the control unit may derive the minimum value of the measured value measured by the pressure sensor as the second leak determination value.

In addition, a second auxiliary canister control valve provided in an auxiliary vent line for connecting the auxiliary canister with the atmosphere may be kept closed, and then may be operated to be opened when the canister control valve is operated to be opened.

According to the leak diagnosis system using the purge pump of the active purge system and the leak diagnosis method using the purge pump of the active purge system according to an embodiment of the present disclosure provided as described above, since the auxiliary canister control valve is kept closed during the leak diagnosis, the evaporated gas does not flow into the intake pipe during the leak diagnosis, and ultimately, the air filter provided in the intake pipe is prevented from being contaminated, or the evaporated gas is prevented from flowing out through the intake pipe.

In addition, since the evaporated gas moves from the canister toward the auxiliary canister, the evaporated gas is prevented from flowing out into the atmosphere.

DETAILED DESCRIPTION OF ILLUSTRATIVE EMBODIMENTS

Hereinafter, a leak diagnosis system using a purge pump of an active purge system and a leak diagnosis method using the purge pump of the active purge system according to an embodiment of the present disclosure will be described with reference to the accompanying drawings.

Figure 4:
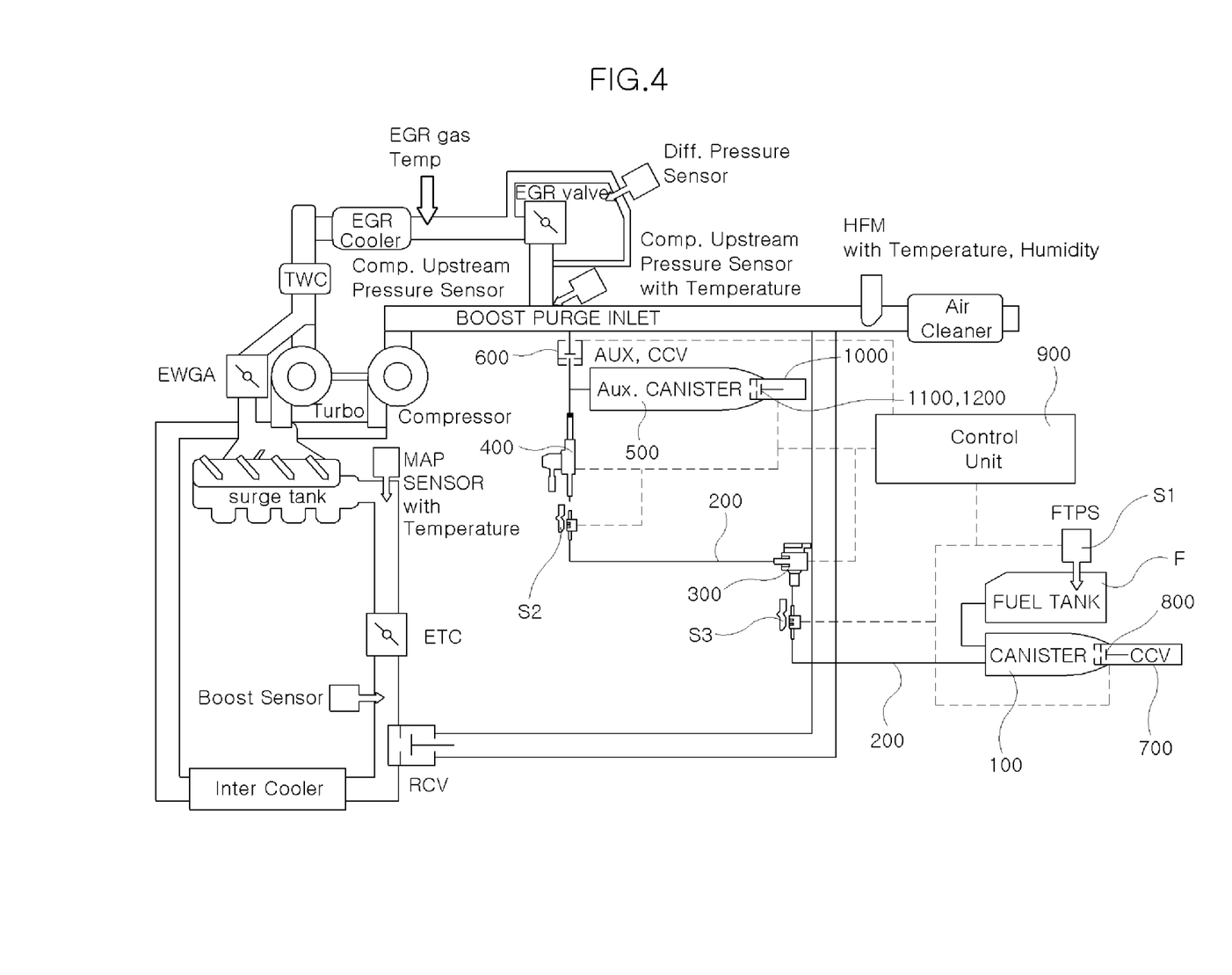
FIG. 4 is an exemplary diagram showing a leak diagnosis system using a purge pump of an active purge system according to an embodiment of the present disclosure.

As shown in FIG. 4, a leak diagnosis system using a purge pump of an active purge system according to an embodiment of the present disclosure includes a canister 100 for adsorbing an evaporated gas from a fuel tank (F), a purge line 200 for connecting the canister 100 with an intake pipe, a purge pump 300 and a purge control solenoid valve 400 mounted to the purge line 200, an auxiliary canister 500 and an auxiliary canister control valve 600 mounted to the purge line 200 to be located between the intake pipe and the purge control solenoid valve 400, a vent line 700 for connecting the canister 100 with the atmosphere, a canister control valve 800 located in the vent line 700, a control unit 900 for controlling the operations of the purge pump 300, the purge control solenoid valve 400, the canister control valve 800, and the auxiliary canister control valve 600, an auxiliary vent line 1000 for connecting the auxiliary canister 500 with the atmosphere, and a filter 1100 and a second auxiliary canister control valve 1200 provided in the auxiliary vent line 1000.

A first pressure gauge (S2) is mounted to the purge line 200 to be located between the purge pump 300 and the purge control solenoid valve 400. A second pressure gauge (S3) is mounted to the purge line 200 to be located between the canister 100 and the purge pump 300.

The leak diagnosis system using the purge pump of the active purge system according to an embodiment of the present disclosure configured as described above may adjust the RPM of the purge pump 300, and the opening amount and opening and closing timing of the purge control solenoid valve 400, according to the pressure difference between the front end and the rear end of the purge pump 300 when purging the evaporated gas.

During the purging process, as the RPM of the purge pump 300, and the opening amount and the opening and closing timing of the purge control solenoid valve 400 are adjusted, the amount of the evaporated gas flowing into the intake pipe from the canister 100 may be adjusted.

In particular, as the evaporated gas flows into the intake pipe, the amount of hydrocarbon additionally supplied to a combustion chamber may be adjusted. When the fuel injection amount and the amount of hydrocarbon additionally supplied to the combustion chamber are complexly adjusted, rich combustion may be prevented. Accordingly, it is possible to minimize pollutants generated by purging the evaporated gas.

Meanwhile, the control unit 900 diagnoses the leak of the fuel tank (F), the canister 100, the purge line 200, and the auxiliary canister 500 from a signal generated by the pressure sensor (S1) provided in the fuel tank (F).

Figure 5:
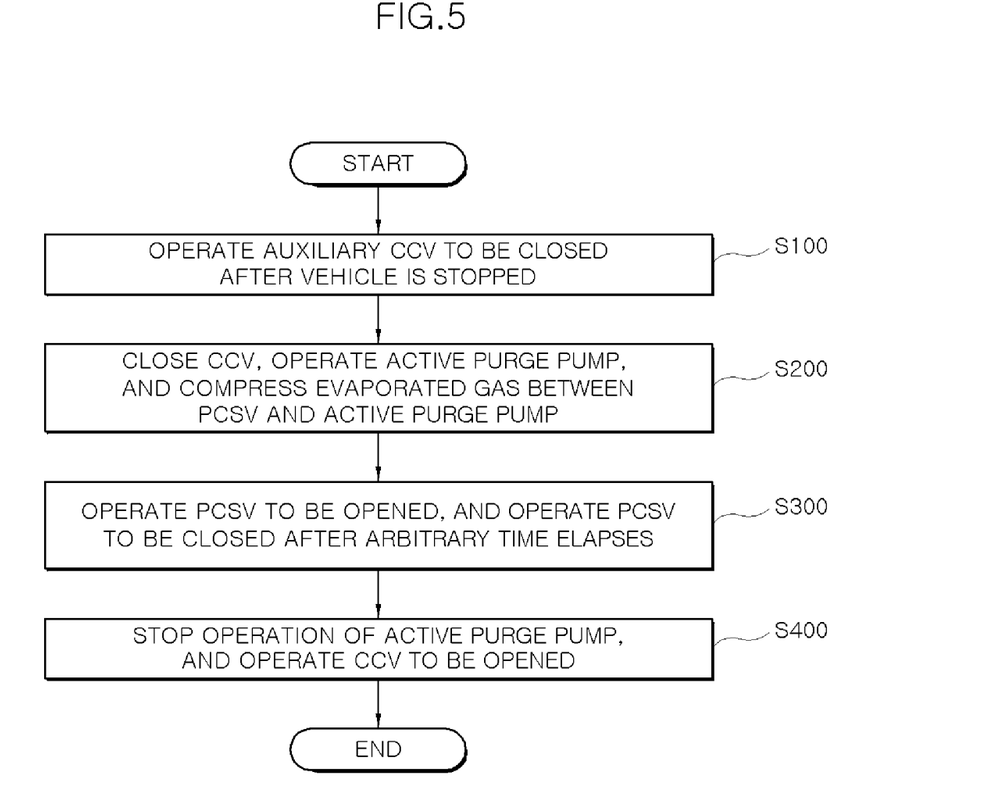
FIGS. 5 and 6 are flowcharts showing a leak diagnosis method using the purge pump of the active purge system according to an embodiment of the present disclosure.
Figure 6:
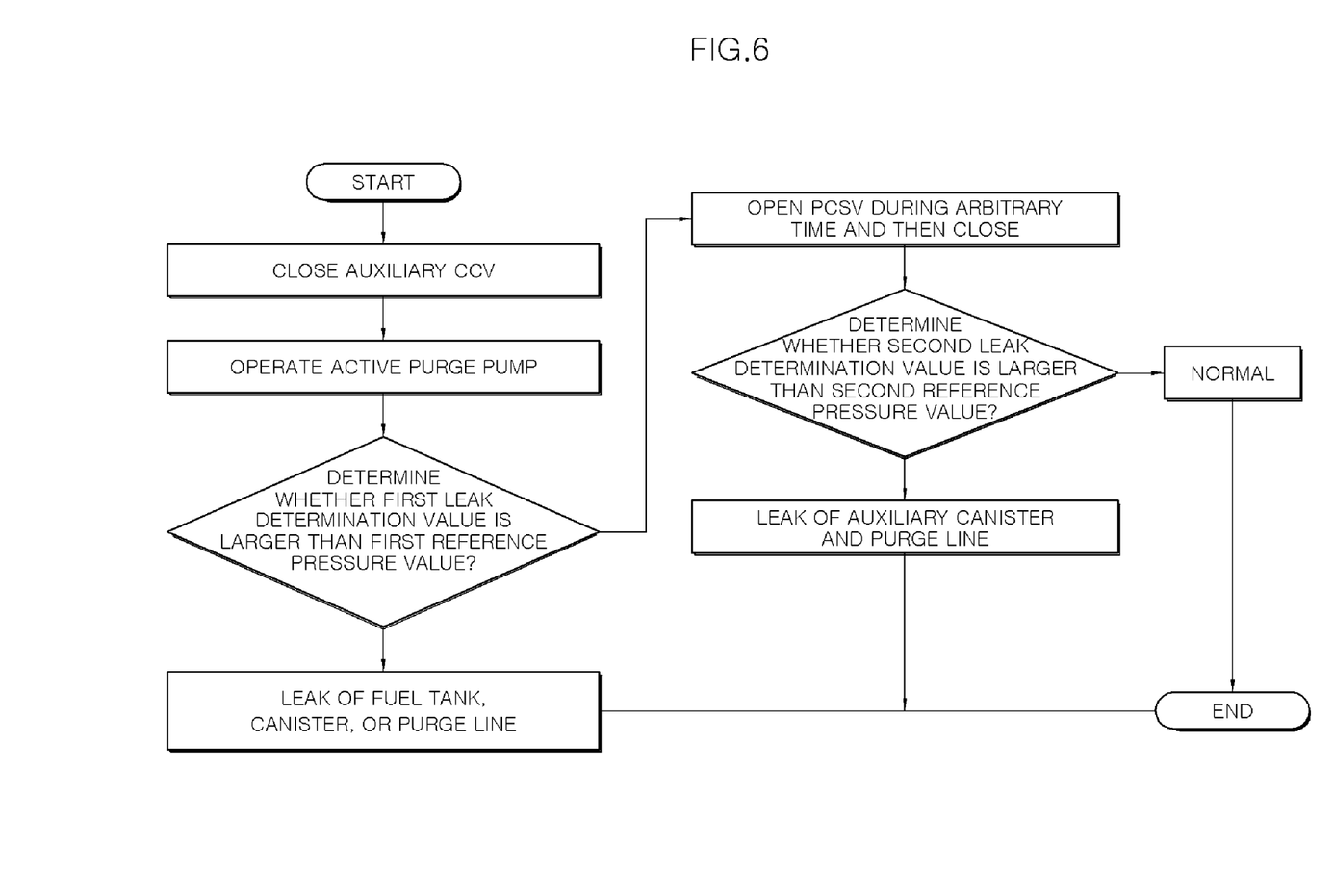
Figure 7:
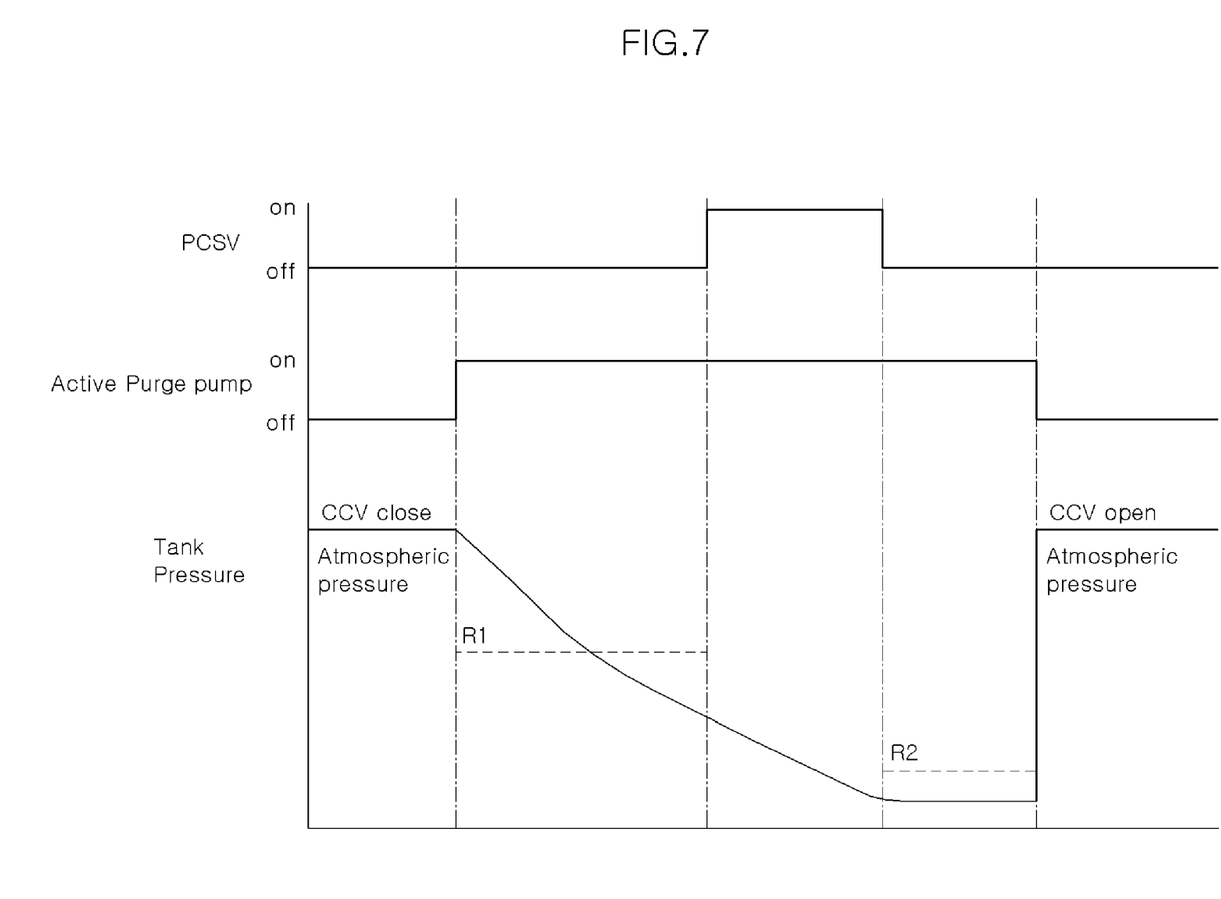
FIG. 7 is a graph of a signal generated by a pressure sensor mounted to a fuel tank during the leak diagnosis.

As shown in FIGS. 5 to 7, a leak diagnosis method using the purge pump of the active purge system according to an embodiment of the present disclosure includes operating the auxiliary canister control valve 600 to be closed after the vehicle is stopped (S100), closing the canister control valve 800, operating the purge pump 300, and compressing an evaporated gas between the purge control solenoid valve 400 and the purge pump 300 (S200), operating the purge control solenoid valve 400 to be opened and operating the purge control solenoid valve 400 to be closed after an arbitrary time elapses (S300), and stopping the operation of the purge pump 300 and operating the canister control valve 800 to be opened (S400).

According to an example, after the purge control solenoid valve 400 is operated to be opened, the purge control solenoid valve 400 may be operated to be closed after 30 minutes. In addition, after the purge control solenoid valve 400 is closed, the operation of the purge pump 300 may be stopped after one minute and the canister control valve 800 may be operated to be opened.

In the operating of the auxiliary canister control valve 600 to be closed after the vehicle is stopped, the control unit 900 derives a first reference pressure value (R1) and a second reference pressure value (R2) from the atmospheric pressure measured by the sensor provided in the vehicle.

The control unit 900 stores a table, a graph, and an equation for deriving the first reference pressure value (R1) and the second reference pressure value (R2) by using the measured atmospheric pressure as a variable. The table, the graph, and the equation are derived from repeated experiments. In addition to the atmospheric pressure, an atmospheric temperature, a coolant temperature, a temperature of the fuel existing in the fuel tank (F), and the like may also be applied to the table, the graph, and the equation as variables.

In the closing of the canister control valve 800, operating the purge pump 300, and compressing of the evaporated gas between the purge control solenoid valve 400 and the purge pump 300, the control unit 900 compares the first leak determination value measured by the pressure sensor (S1) provided in the fuel tank (F) with the first reference pressure value (R1).

The control unit 900 determines that the purge line 200, the fuel tank (F), or the canister 100 has leaked when the first leak determination value is larger than the first reference pressure value (R1). When it is determined that the leak has occurred, the control unit 900 may display a leak signal on an instrument panel, or generate an alarm sound.

The control unit 900 derives the minimum value of the measured value measured by the pressure sensor (S1) as the first leak determination value.

In addition, the control unit 900 compares the second leak determination value measured by the pressure sensor (S1) provided in the fuel tank (F) and the second reference pressure value (R2) between the operating of the purge control solenoid valve 400 to be opened and operating the purge control solenoid valve 400 to be closed after an arbitrary time elapses, and the stopping of the operation of the purge pump 300 and operating of the canister control valve 800 to be opened.

The control unit 900 determines that the purge line 200 or the auxiliary canister 500 has leaked when the second leak determination value is larger than the second reference pressure value (R2). The control unit 900 derives the minimum value of the measured value measured by the pressure sensor (S1) as the second leak determination value.

Through the stopping of the operation of the purge pump 300 and operating the canister control valve 800 to be opened, the internal pressures of the fuel tank (F), the canister 100, and the purge line 200 become equal to the atmosphere.

In addition, the second auxiliary canister control valve 1200 provided in the auxiliary vent line 1000 for connecting the auxiliary canister 500 with the atmosphere is kept closed and then is operated to be opened when the canister control valve 800 is operated to be opened. Accordingly, the internal pressures of the purge control solenoid valve 400, the intake pipe section, and the auxiliary canister 500 in the purge line 200 also become equal to the atmosphere.

According to the leak diagnosis system using the purge pump of the active purge system and the leak diagnosis method using the purge pump of the active purge system according to an embodiment of the present disclosure provided as described above, since the auxiliary canister control valve 600 is kept closed during the leak diagnosis, the evaporated gas does not flow into the intake pipe during the leak diagnosis, and the air filter provided in the intake pipe is ultimately prevented from being contaminated, or the evaporated gas is prevented from flowing out through the intake pipe.

What is claimed is:

1. A leak diagnosis system comprising:
   a canister for adsorbing an evaporated gas from a fuel tank;
   a purge line for connecting the canister with an intake pipe;
   a purge pump and a purge control solenoid valve mounted to the purge line; and
   an auxiliary canister and an auxiliary canister control valve mounted to the purge line and located between the intake pipe and the purge control solenoid valve.

2. The leak diagnosis system of claim 1, further comprising:
   an auxiliary vent line for connecting the auxiliary canister with an atmosphere; and
   a filter and a second auxiliary canister control valve provided in the auxiliary vent line.

3. The leak diagnosis system of claim 1, further comprising:

a first pressure gauge mounted to the purge line at a location between the purge pump and the purge control solenoid valve; and a second pressure gauge mounted to the purge line at a location between the canister and the purge pump.

4. The leak diagnosis system of claim 1, further comprising:

a vent line for connecting the canister with an atmosphere;

a canister control valve located in the vent line; and a control unit for controlling operations of the purge pump, the purge control solenoid valve, the canister control valve, and the auxiliary canister control valve.

5. The leak diagnosis system of claim 4, wherein the control unit is configured to diagnose a leak in the fuel tank, the canister, the purge line, or the auxiliary canister from a signal generated by a pressure sensor provided in the fuel tank.

6. A leak diagnosis method using a purge pump of an active purge system which diagnoses a leak by a leak diagnosis system, the leak diagnosis system including a canister for adsorbing an evaporated gas from a fuel tank, a purge line for connecting the canister with an intake pipe, the purge pump and a purge control solenoid valve mounted to the purge line, an auxiliary canister and an auxiliary canister control valve mounted to the purge line and located between the intake pipe and the purge control solenoid valve, a vent line for connecting the canister with an atmosphere, a canister control valve located in the vent line, and a control unit for controlling operations of the purge pump, the purge control solenoid valve, the canister control valve, and the auxiliary canister control valve, the method comprising:

operating the auxiliary canister control valve to be closed after a vehicle is stopped;

closing the canister control valve, operating the purge pump, and compressing the evaporated gas between the purge control solenoid valve and the purge pump;

operating the purge control solenoid valve to be opened and operating the purge control solenoid valve to be closed after an arbitrary time elapses; and stopping the operation of the purge pump and operating the canister control valve to be opened.

7. The method of claim 6, wherein operating the auxiliary canister control valve to be closed after the vehicle is stopped, comprises deriving, by the control unit, a first reference pressure value and a second reference pressure value from an atmospheric pressure measured by a sensor provided in the vehicle.

8. The method of claim 7, wherein the control unit stores a table, a graph, and an equation for deriving the first reference pressure value and the second reference pressure value by using the measured atmospheric pressure as a variable.

9. The method of claim 7, wherein closing the canister control valve, operating the purge pump, and compressing the evaporated gas between the purge control solenoid valve and the purge pump comprises comparing, by the control unit, a first leak determination value measured by a pressure sensor provided in the fuel tank with the first reference pressure value.

10. The method of claim 9, wherein the control unit determines that the purge line, the fuel tank, or the canister has leaked when the first leak determination value is larger than the first reference pressure value.

11. The method of claim 9, wherein the control unit derives a minimum value of a measured value measured by the pressure sensor as the first leak determination value.

12. The method of claim 7, wherein the method further comprises, between operating the purge control solenoid valve to be opened and operating the purge control solenoid valve to be closed after the arbitrary time elapses and stopping the operation of the purge pump and operating the canister control valve to be opened, comparing, by the control unit, a second leak determination value measured by a pressure sensor provided in the fuel tank with the second reference pressure value.

13. The method of claim 12, wherein the control unit determines that the purge line or the auxiliary canister has leaked when the second leak determination value is larger than the second reference pressure value.

14. The method of claim 12, wherein the control unit derives a minimum value of a measured value measured by the pressure sensor as the second leak determination value.

15. The method of claim 6, wherein a second auxiliary canister control valve provided in an auxiliary vent line for connecting the auxiliary canister with the atmosphere is kept closed, and then is operated to be opened when the canister control valve is operated to be opened.

16. A vehicle comprising a leak diagnosis system, the vehicle comprising:

a canister for adsorbing an evaporated gas from a fuel tank;

a purge line connecting the canister with an intake pipe;

a purge pump mounted to the purge line;

a purge control solenoid valve mounted to the purge line;

an auxiliary canister mounted to the purge line and located between the intake pipe and the purge control solenoid valve; and an auxiliary canister control valve mounted to the purge line and located between the intake pipe and the purge control solenoid valve.

17. The vehicle of claim 16, further comprising:

an auxiliary vent line connecting the auxiliary canister with an atmosphere;

a filter provided in the auxiliary vent line; and a second auxiliary canister control valve provided in the auxiliary vent line.

18. The vehicle of claim 16, further comprising:

a first pressure gauge mounted to the purge line at a location between the purge pump and the purge control solenoid valve; and a second pressure gauge mounted to the purge line at a location between the canister and the purge pump.

19. The vehicle of claim 16, further comprising:

a vent line connecting the canister with an atmosphere;

a canister control valve located in the vent line; and a control unit configured to control operations of the purge pump, the purge control solenoid valve, the canister control valve, and the auxiliary canister control valve.

20. The vehicle of claim 19, further comprising a pressure sensor provided in the fuel tank, wherein the control unit is configured to diagnose a leak in the fuel tank, the canister, the purge line, or the auxiliary canister from a signal generated by the pressure sensor provided in the fuel tank.

* * * * *